(No Model.)

J. R. BAKER.
DUST GUARD FOR CAR AXLES.

No. 305,129. Patented Sept. 16, 1884.

WITNESSES:
Chas. Nida
Edward L. Johns

INVENTOR
Jackson R. Baker

BY
ATTORNEY

UNITED STATES PATENT OFFICE.

JACKSON R. BAKER, OF JERSEY CITY, NEW JERSEY.

DUST-GUARD FOR CAR-AXLES.

SPECIFICATION forming part of Letters Patent No. 305,129, dated September 16, 1884.

Application filed January 14, 1884. (No model.)

*To all whom it may concern:*

Be it known that I, JACKSON R. BAKER, of Jersey City, county of Hudson, State of New Jersey, have invented a new and useful Improvement in Dust-Guards for Railroad-Car Axles; and I declare the following to be a full, clear, and exact description of the same, reference being had to the accompanying sheet of drawings, forming part of this specification.

This invention is in the nature of an improvement in dust-guards for railroad-car axles; and the invention consists in a dust-guard made of a single solid piece of wood, having a circular opening provided with an annular groove in its circumference, combined with an annulus of packing material in said groove, having its inner edge projecting beyond the walls of the groove, as hereinafter described and claimed.

Figure 1:
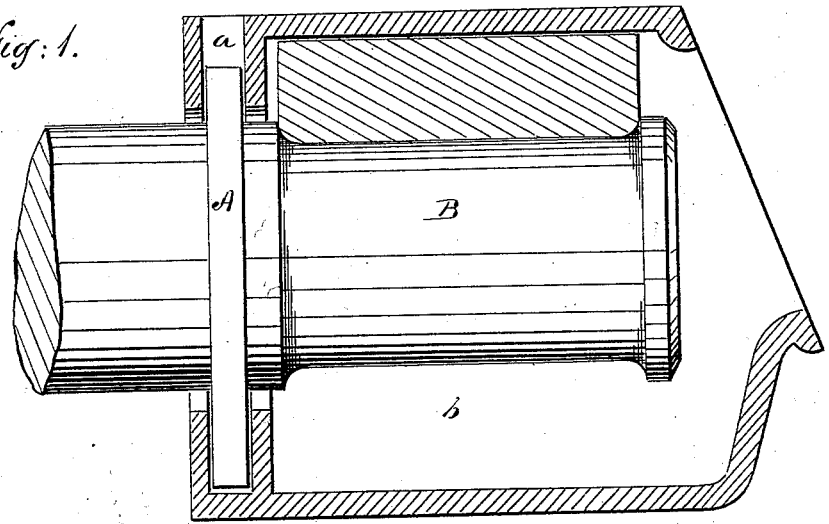
Figure 2:
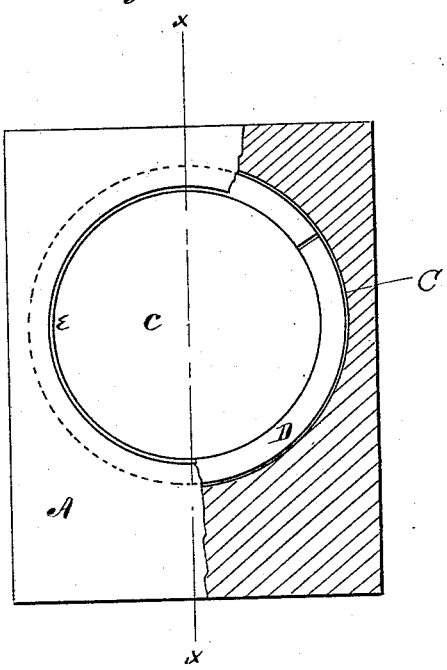
Figure 3:
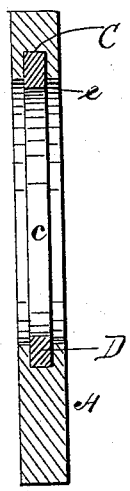

In the accompanying sheet of drawings, Figure 1 is a vertical section showing position of axle in guard. Fig. 2 is a plan or top view, partly in section, showing the packing in plate. Fig. 3 is a section through *x x*, Fig. 2.

Similar letters of reference indicate like parts in the several figures.

This invention is designed to prevent the infiltration of dust into the journal-box or housing, where its presence is soon made manifest by the cutting away of the bearing-brass and axle. Many contrivances have been heretofore employed to keep out this dust; but it is believed the most effective and inexpensive mode is that which is the subject of this invention, as is hereinafter described.

In the construction of my dust-guard, A represents a plate, of any suitable hard wood, or any other material that will not warp. The length, breadth, and thickness of this plate are such as will enable it to fit into the ordinary recesses, *a*, formed in the back of the housing *b*, so as to effectually close the back of the housing. Through this plate A, in a proper position to receive the axle B, is formed a circular opening, *c*, somewhat greater in diameter than the diameter of the axle. Within the circumference of this opening *c* is cut an annular recess or groove, C, of any convenient width and depth. Into this recess or groove is now placed an annulus of packing, D, of any suitable material, such as cotton and rubber fabric, leather, or any other similar material or materials. If the cotton and rubber are employed, I have found it best to saturate them with tallow and graphite, as a lubricant. The edge of the packing should project slightly from the surface of the circumference of the opening *c*. Now, when the axle B is inserted through the opening *c* in the plate A, it is snugly surrounded by the projecting edge *e* of the packing, which excludes the dust from the interior of the housing, thereby preventing the cutting away of the bearing-brass, as before described. Another advantage arising from this construction of my dust-guard is that the edge of the packing D permits the axle to have more or less lateral and other motion within the dust-guard without increasing the wear of the guard or disturbing its position in the housing. Still another advantage from this construction of my dust-guard is that when the packing is worn out and useless new packing may be inserted without necessitating the renewal of the entire guard, the plate remaining as before.

Having now described my invention, what I claim as new, and desire to secure by Letters Patent, is—

A dust-guard for railroad-car axles, consisting of the single solid piece of wood having a circular opening, provided with the annular groove C in the circumference of said opening, combined with an annulus of packing material, D, in said groove, having its inner edge projecting beyond the walls of the groove, substantially as described.

J. R. BAKER.

Witnesses:
G. M. PLYMPTON,
EDWARD L. JOHNS.